United States Patent
Almeida et al.

(10) Patent No.: US 10,757,198 B1
(45) Date of Patent: Aug. 25, 2020

(54) DYNAMIC CABLE OPERATOR PLANT DISCOVERY

(71) Applicant: CSC Holdings, LLC, Bethpage, NY (US)

(72) Inventors: Heitor J. Almeida, Elmsford, NY (US); Jaison Antony, Dix Hills, NY (US); John Markowski, Smithtown, NY (US); Peter Caramanica, Westbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 16/039,669

(22) Filed: Jul. 19, 2018

(51) Int. Cl.
*H04L 12/26* (2006.01)
*H04L 29/08* (2006.01)
*H04L 12/24* (2006.01)

(52) U.S. Cl.
CPC .............. *H04L 67/16* (2013.01); *H04L 41/12* (2013.01)

(58) Field of Classification Search
CPC ................................ H04L 67/16; H04L 41/12
USPC ......................................................... 370/254
See application file for complete search history.

(56) References Cited

U.S. PATENT DOCUMENTS

| | | | | |
|---|---|---|---|---|
| 2004/0162092 A1* | 8/2004 | Marsico | ............ | H04M 3/42153 455/463 |
| 2006/0268902 A1* | 11/2006 | Bonner | ................ | H04L 63/102 370/401 |
| 2008/0095173 A1* | 4/2008 | Bugenhagen | ......... | H04L 1/0001 370/395.21 |
| 2011/0222477 A1* | 9/2011 | Wu | ...................... | H04L 12/1845 370/328 |
| 2012/0094594 A1* | 4/2012 | Rofougaran | .......... | G06F 1/1626 455/15 |
| 2012/0220240 A1* | 8/2012 | Rothschild | ............ | H04W 24/08 455/67.11 |
| 2015/0281929 A1* | 10/2015 | Shih | ........................ | H04W 4/90 455/404.1 |
| 2017/0048855 A1* | 2/2017 | Garg | ....................... | H04L 43/16 |

* cited by examiner

*Primary Examiner* — Faisal Choudhury
(74) *Attorney, Agent, or Firm* — Sterne, Kessler, Goldstein & Fox P.L.L.C.

(57) ABSTRACT

The present disclosure describes a point-to-multipoint communication system having a service provider system and one or more subscriber devices. The one or more subscriber devices include multiple physical layer (PHY) devices that can be used for upstream direction and/or downstream direction transfer of information to and/or from the service provider system. The one or more subscriber devices receive subscriber device configuration information from the service provider system indicating which of these multiple PHY devices are to be used for the upstream direction and/or the downstream direction transfer of the information to and/or from the service provider system. In some situations, the subscriber device configuration information identifies various types of information, such as video, audio, and/or data to provide some examples, to be transferred in the upstream direction and/or the downstream direction and/or one or more PHY devices to be used for transferring the various types of information.

20 Claims, 4 Drawing Sheets

DYNAMIC CABLE OPERATOR PLANT DISCOVERY

BACKGROUND

Traditionally, service provider systems solely utilize wireline communication standards or protocols, such as a version of a Data Over Cable Service PHY device Specification (DOCSIS) communication standard or protocol, such as DOCSIS 3.0, DOCSIS 3.1, and/or DOCSIS 3.1 Full Duplex to provide some examples, to provide a service to one or more subscriber devices. As more wireline communication standards or protocols and wireless communication standards or protocols become available, it would be advantageous for service provider systems to implement these additional communication standards or protocols to provide the service.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 3:
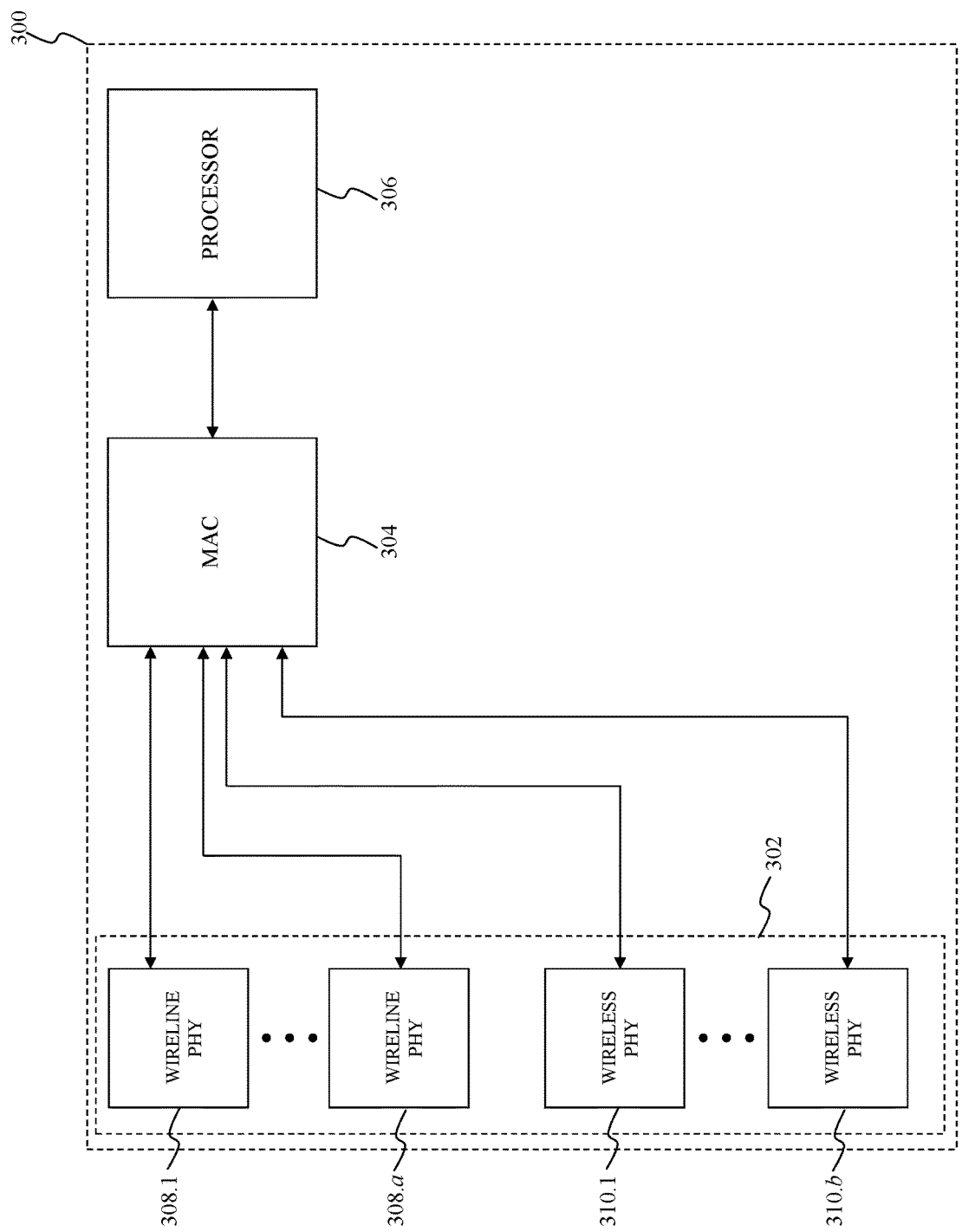
Figure 4:
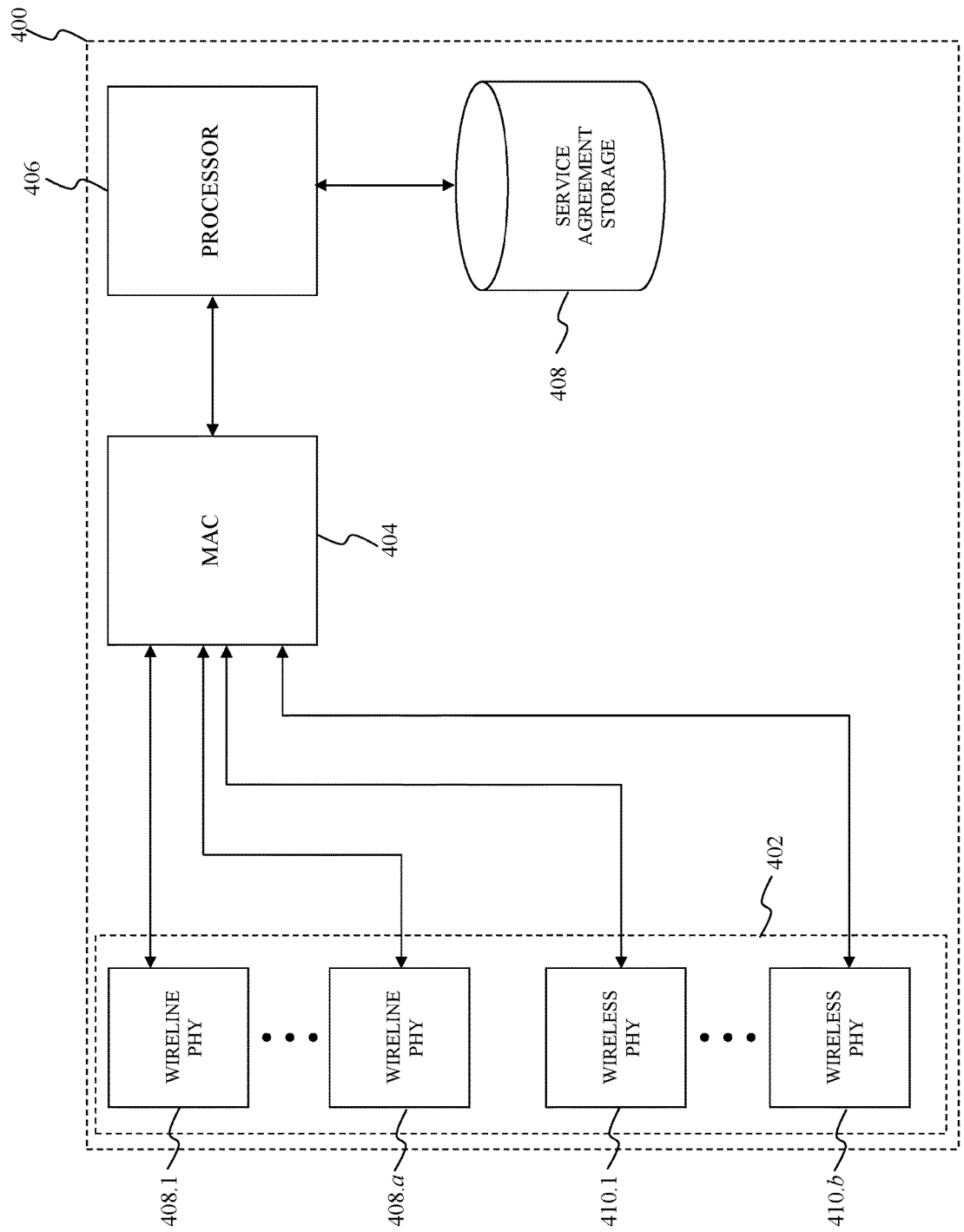

FIG. 3 illustrates a block diagram of a subscriber device that can be implemented within the exemplary point-to-multipoint communication system according to an embodiment of the present disclosure; and FIG. 4 illustrates a block diagram of a service provider system that can be implemented within the exemplary point-to-multipoint communication system according to an embodiment of the present disclosure.

The present disclosure will now be described with reference to the accompanying drawings.

DETAILED DESCRIPTION OF THE DISCLOSURE

Overview

The present disclosure describes a point-to-multipoint communication system having a service provider system and one or more subscriber devices. The one or more subscriber devices include multiple physical layer (PHY) devices that can be used for upstream direction and/or downstream direction transfer of information to and/or from the service provider system. The one or more subscriber devices receive subscriber device configuration information from the service provider system indicating which of these multiple PHY devices are to be used for the upstream direction and/or the downstream direction transfer of the information to and/or from the service provider system. In some situations, the subscriber device configuration information identifies various types of information, such as video, audio, and/or data to provide some examples, to be transferred in the upstream direction and/or the downstream direction and/or one or more PHY devices to be used for transferring the various types of information.

Exemplary Point-to-Multipoint Communication System

Figure 1:
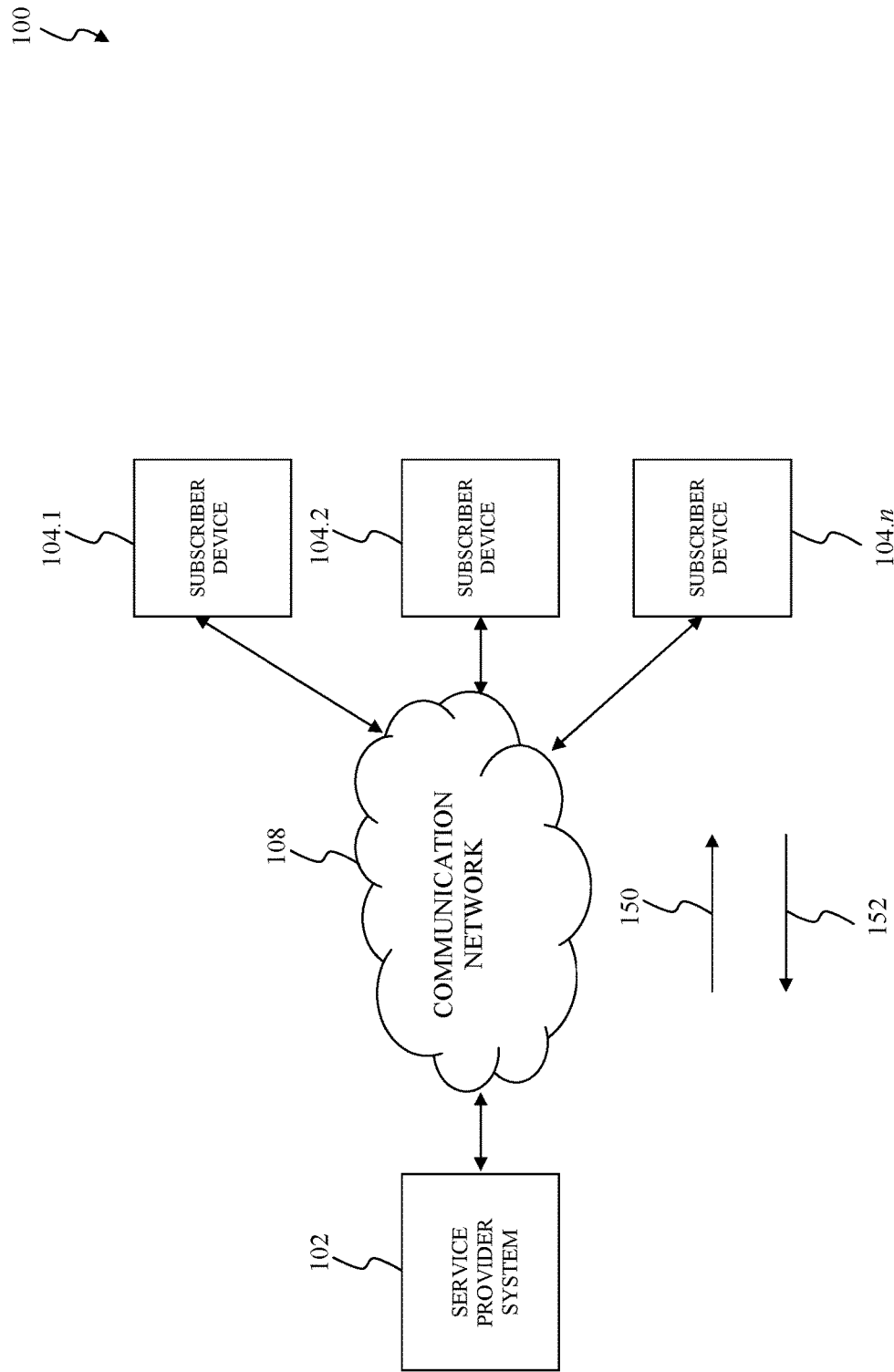
FIG. 1 illustrates a block diagram of an exemplary point-to-multipoint communication system according to an embodiment of the present disclosure.

FIG. 1 illustrates a block diagram of an exemplary point-to-multipoint communication system according to an embodiment of the present disclosure. A point-to-multipoint communication system 100 includes a service provider system 102 to provide a service, such bi-directional communication of video, audio, and/or data to provide some examples, to subscriber devices 104.1 through 104.n. The subscriber devices 104.1 through 104.n represent one or more personal computers, data terminal equipment, one or more telephony devices, such as one or more mobile phones or one or more mobile computing devices to provide some examples, one or more broadband media players, one or more network-controlled appliances, one or more set-top boxes, one or more wireless routers, and/or other devices that are capable of transmitting and/or receiving video, audio, and/or data that will be apparent to those skilled in the relevant art(s) without departing from the spirit and scope of the present disclosure. As used herein, the term "downstream direction" refers to the transfer of information in a first direction 150 from the service provider system 102 to the subscriber devices 104.1 through 104.n. The term "upstream direction" refers to the transfer of information in a second direction 152 from the subscriber devices 104.1 through 104.n to the service provider system 102.

In the exemplary embodiment illustrated in FIG. 1, the service provider system 102 manages the upstream direction and/or the downstream direction transfer of information to and/or from the subscriber devices 104.1 through 104.n. In an exemplary embodiment, the service provider system 102 manages the upstream direction and/or the downstream direction transfer of the information in accordance with a service agreement between the service provider system 102 and the subscriber devices 104.1 through 104.n to implement the service. In this exemplary embodiment, the service agreement identifies various types of information, such as video, audio, and/or data to provide some examples, to be transferred in the upstream direction and/or the downstream direction and/or one or more physical layer (PHY) devices that are compliant with one or more communication standards or protocols, for example, one or more wireless communication standards or protocols and/or one or more wireline communication standards or protocols, to be used for transferring the various types of information. The one or more wireless communication standards or protocols can include various wireless networking communication standards or protocols, such as a version of an Institute of Electrical and Electronics Engineers (I.E.E.E.) 802.11 communication standard, for example, 802.11a, 802.11b/g/n, 802.11h, and/or 802.11ac which are collectively referred to as Wi-Fi, an I.E.E.E. 802.16 communication standard, also referred to as WiMax, a version of a Bluetooth communication standard, a version of a ZigBee communication standard, a version of a Z-Wave communication standard, a version of a IPv6 over Low power Wireless Personal Area Networks (6LoWPAN) communication standard, a version of Insteon, an ISO/IEC 14543-3-10 communication standard, also referred to as EnOcean, and/or or any other wireless communication standard or protocol that will be apparent to those skilled in the relevant art(s) without departing from the spirit and scope of the present disclosure. The one or more wireline communication standards or protocols can include a version of an Institute of Electrical and Electronics Engineers (IEEE) 802.3 communication standard or protocol, also referred as Ethernet, such as 50G Ethernet, 100G Ethernet, 200G Ethernet, and/or 400G Ethernet to provide some examples, a version of a Data Over Cable Service PHY device Specification (DOCSIS) communication standard or protocol, such as DOCSIS 3.0, DOCSIS 3.1, and/or DOCSIS 3.1 Full Duplex to provide some examples, and/or or any other wireline communication standard or protocol that will be apparent to those skilled in the relevant art(s) without departing from the spirit and scope of the present disclosure.

The subscriber devices 104.1 through 104.n negotiate the upstream direction and/or the downstream direction transfer of the information with the service provider system 102. In an exemplary embodiment, this negotiation is performed upon activation of the service, for example, upon powering up the subscriber devices 104.1 through 104.n. In this exemplary embodiment, the subscriber devices 104.1 through 104.n represent universal subscriber devices that can be configured to transfer the information in the upstream direction and the downstream without the need for prior configuration of the subscriber devices 104.1 through 104.n which is conventionally achieved through prior configuration of specialized software within the subscriber devices 104.1 through 104.n by a specialized technician. The negotiation between the service provider system 102 and the subscriber devices 104.1 through 104.n can allow the subscriber devices 104.1 through 104.n to be configured in real-time often by customers of the service to transfer the information in the upstream direction and/or the downstream direction.

In the exemplary embodiment illustrated in FIG. 1, each of the subscriber devices 104.1 through 104.n includes one or more wireless PHY devices that are complaint with the one or more wireless communication standards or protocols and/or one or more wireline PHY devices that are complaint with the one or more wireline communication standards or protocols. In this exemplary embodiment, each of the subscriber devices 104.1 through 104.n and the service provider system 102 negotiate one or more of the one or more wireless PHY devices and/or one or more wireline PHY devices to provide one or more negotiated PHY devices to be used for the upstream direction and/or the downstream direction transfer of the information. Thereafter, the subscriber devices 104.1 through 104.n and the service provider system 102 can transfer the information in the upstream direction and/or the downstream direction using the one or more negotiated PHY devices.

Moreover, in this exemplary embodiment, each of the subscriber devices 104.1 through 104.n and the service provider system 102 can optionally negotiate the types of information, such as video, audio, and/or data to provide some examples, to be transferred in the upstream direction and/or the downstream direction using the one or more negotiated PHY devices. In some situations, the service agreement predefines the one or more negotiated PHY devices to be used for the upstream direction and/or the downstream direction transfer of the information and/or the types of information, such as video, audio, and/or data to provide some examples, to be transferred in the upstream direction and/or the downstream direction. For example, each of the subscriber devices 104.1 through 104.n and the service provider system 102 can negotiate one or more wireless PHY devices are to be used for transferring data in the upstream direction and/or the downstream direction and one or more wireline PHY devices are to be used for transferring video and/or audio in the upstream direction and/or the downstream direction. As another example, each of the subscriber devices 104.1 through 104.n and the service provider system 102 can negotiate one or more wireline PHY devices are to be used for transferring video, audio, and/or data in the upstream direction and/or the downstream direction. As a further example, each of the subscriber devices 104.1 through 104.n and the service provider system 102 can negotiate one or more wireless PHY devices are to be used for transferring video, audio, and/or data in the upstream direction and/or the downstream direction.

The communication network 108 communicatively couples the service provider system 102 and the subscriber devices 104.1 through 104.n. The communication network 108 can implemented as a wireless communication network, a wired communication network, and/or any combination thereof that will be apparent to those skilled in the relevant art(s) without departing from the spirit and scope of the present disclosure. For example, the communication network 108 can include one or more radio networks, such as terrestrial radio frequency networks or satellite radio frequency networks, one or ore coaxial cable networks, and/or one or more fiber optic cable networks.

Figure 2:
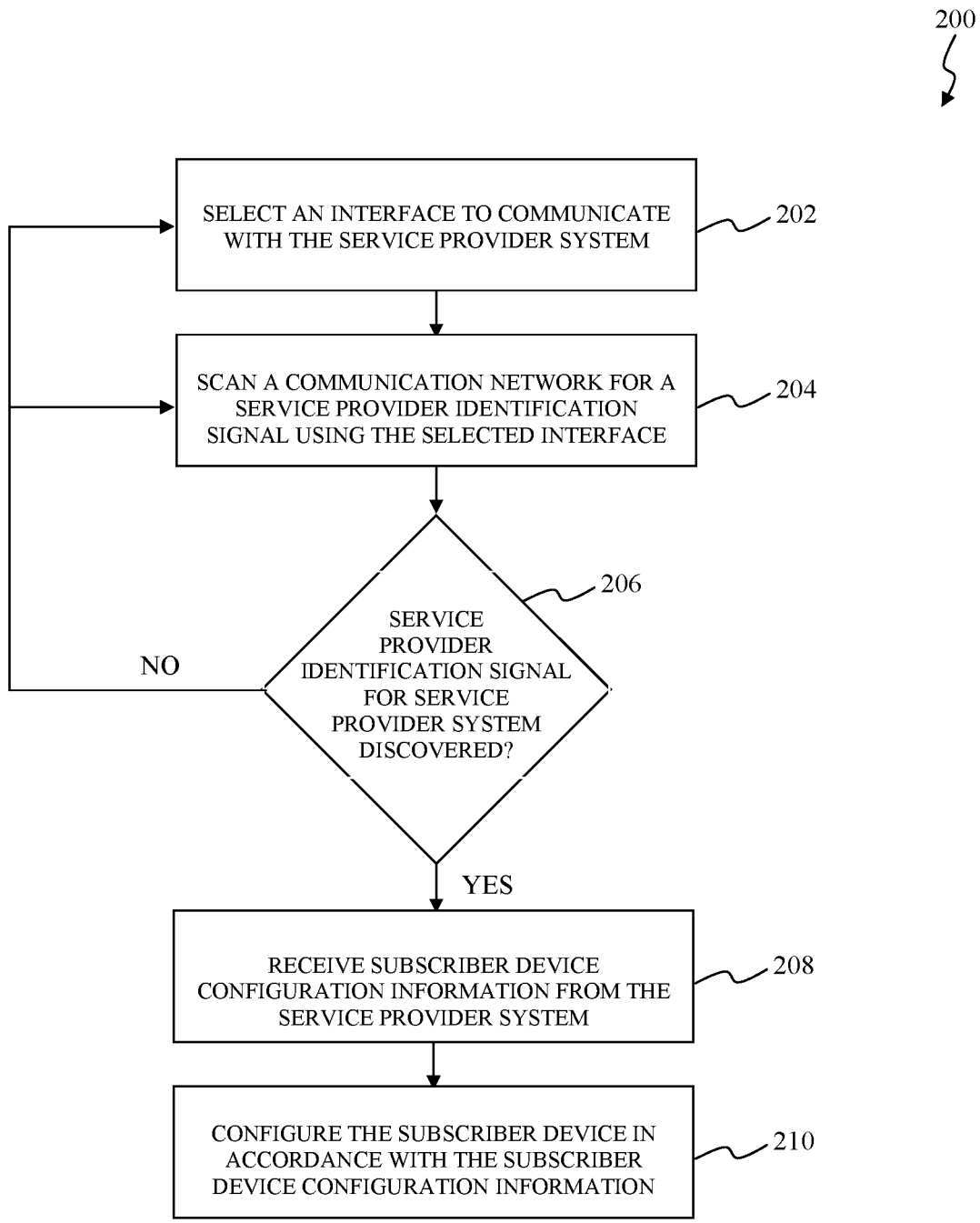
FIG. 2 is a flowchart of exemplary operational steps for a negotiation between subscriber devices and a service provider system within the exemplary point-to-multipoint communication system according to an embodiment of the present disclosure.

Exemplary Negotiation Between a Subscriber Device and a Service Provider System within the Point-to-Multipoint Communication System FIG. 2 is a flowchart of exemplary operational steps for a negotiation between subscriber devices and a service provider system within the exemplary point-to-multipoint communication system according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 between a subscriber device, such as one or more of the subscriber devices 104.1 through 104.n as described above in FIG. 1 to provide an example, and a service provider system, such as the service provider system 102 as described above in FIG. 1 to provide an example, within the exemplary point-to-multipoint communication system. As described above in FIG. 1, the service provider system manages the upstream direction and/or the downstream direction transfer of the information in accordance with a service agreement between the service provider system and the subscriber device to implement the service.

At operation 202, the operational control flow 200 selects a PHY device from among multiple PHY devices of the subscriber device to communicate with the service provider system. As described above in FIG. 1, the subscriber device includes one or more wireless PHY devices that are complaint with the one or more wireless communication standards or protocols and/or one or more wireline PHY devices that are complaint with the one or more wireline communication standards or protocols. In an exemplary embodiment, the subscriber device can include an instruction manual having one or more instructions that causes a consumer of the service that is associated with the subscriber device to communicatively couple, for example, plug in, one or more communication cables, such as one or more coaxial cables and/or one or more fiber optics cables to provide some examples, to the subscriber device. In this exemplary embodiment, the operational control flow 200 selects a wireline PHY device from among the one or more wireline PHY devices which is communicatively coupled to the one or more communication cables. In another exemplary embodiment, the subscriber device automatically selects a wireless PHY device from among the one or more wireless PHY devices upon activation, for example, power-up, of the subscriber device. In some situations, the operational control flow 200 can request identifying information, such as a username or a password to provide some examples, from the consumer of the service before selecting the PHY device.

At operation 204, the operational control flow 200 scans a communication network, such as the communication network 108 as described above in FIG. 1, for a service provider identification signal from the service provider system using the selected PHY device. In an exemplary embodiment, the service provider identification signal includes information that uniquely identifies the service provider system to the subscriber device. For example, the information can include a network identifier of the service provider system, a geographic location of the service provider system, and/or a network address of the service provider system to provide some examples.

At operation 206, the operational control flow 200 determines whether the service provider identification signal from the service provider system. In some situations, the operational control flow 200 is unable to discover any service provider identification signals for any service provider systems during the scan of the communication network. In these situations, the operational control flow 200 reverts to operation 202 to select another PHY device from among multiple PHY devices of the subscriber device to communicate with the service provider system. In other situations, the operational control flow 200 discovers the service provider identification signal during the scan of the communication network. Thereafter, the operational control flow 200 determine whether the service provider identification signal corresponds to the service provider system or another service provider system without the service agreement. For example, the operational control flow 200 recovers the information from the service provider identification signal and compares this information with previously stored information of the service provider system within the subscriber device. In these situations, when the recovered information from the service provider identification signal does not match the previously stored information of the service provider system, the operational control flow 200 has discovered the other service provider system without the service agreement. Thereafter, the operational control flow 200 can revert to operation 204 to continue to scan the communication network for the service provider identification signal. Otherwise, the operational control flow 200 has discovered the service provider system when the recovered information from the service provider identification signal matches the previously stored information of the service provider system. Thereafter, the operational control flow 200 proceeds to operation 208.

At operation 208, the operational control flow 200 receives subscriber device configuration information from the service provider system to configure the subscriber device for the upstream direction and/or the downstream direction transfer of information between the service provider system and the subscriber device. In an exemplary embodiment, the upstream direction and/or the downstream direction transfer of the information between the service provider system and the subscriber device is in accordance with the service agreement. In this exemplary embodiment, the service agreement identifies various types of information, such as video, audio, and/or data to provide some examples, to be transferred in the upstream direction and/or the downstream direction and/or one or more PHY devices, for example, one or more wireless PHY devices or protocols and/or one or more wireline PHY devices, to be used for transferring the various types of information.

In this exemplary embodiment, the subscriber device configuration information identifies one or more PHY devices from among the multiple PHY devices to be used for the upstream direction and/or the downstream direction transfer of information between the service provider system and the subscriber device. Optionally, the subscriber device configuration information can identify types of information, such as the video, the audio, and/or the data to provide some examples, to be transferred in the upstream direction and/or the downstream direction using the one or more PHY devices. For example, the configuration information can indicate a wireless PHY device, such as Wi-Fi to provide an example, is to be used for transferring data in the upstream direction and/or the downstream direction and a wireline PHY device, such as a DOCSIS compliant PHY device, fiber optic PHY device, or Ethernet PHY device to provide some examples, is to be used for transferring video and/or audio in the upstream direction and/or the downstream direction. As another example, the configuration information can indicate the wireline PHY device is to be used for transferring video, audio, and/or data in the upstream direction and/or the downstream direction. As a further example, the configuration information can indicate the wireless PHY device is to be used for transferring video, audio, and/or data in the upstream direction and/or the downstream direction. In some situations, the subscriber device configuration information need not identify the PHY device from operation 202 as being used to transferring video, audio, and/or data in the upstream direction and/or the downstream direction.

At operation 210, the operational control flow 200 configures the subscriber device in accordance with the subscriber device configuration information. In an exemplary embodiment, the operational control flow 200 can activate one or more wireless PHY devices and/or one or more wireline PHY devices from among the multiple PHY devices of the subscriber device in accordance with the subscriber device configuration information to communicate with the service provider system. For example, the operational control flow 200 can request the consumer of the service that is associated with the subscriber device to communicatively couple, for example, plug in, one or more communication cables, such as one or more coaxial cables and/or one or more fiber optics cables to provide some examples, that are associated with one or more wireline PHY devices in accordance with the subscriber device configuration information. In this example, the operational control flow 200 activates a wireline PHY device from among the one or more wireline PHY devices which is communicatively coupled to the one or more communication cables to communicate with the service provider system. In another example, the operational control flow 200 can request identifying information, such as a username or a password to provide some examples, from the consumer of the service before selecting the PHY device. In this other example, the operational control flow 200 activates a wireless PHY device from among the one or more wireless PHY devices which is associated with the identifying information to communicate with the service provider system.

Exemplary Subscriber Device within the Point-to-Multipoint Communication System

FIG. 3 illustrates a block diagram of a subscriber device that can be implemented within the exemplary point-to-multipoint communication system according to an embodiment of the present disclosure. A subscriber device 300 includes multiple physical layer (PHY) devices for the upstream direction and/or the downstream direction transfer of information to and/or from a service provider system, such as the service provider system 102 as described above in FIG. 1 to provide an example, within the exemplary point-to-multipoint communication system. As to be described in further detail below, the multiple PHY devices can include includes one or more wireless PHY devices that are complaint with the one or more wireless communication standards or protocols and/or one or more wireline PHY devices that are complaint with the one or more wireline communication standards or protocols. The subscriber device 300 can be configured to transfer the information using the one or more wireless PHY devices, the one or more wireline PHY devices, and/or any combination of the one or more wireless PHY devices and the one or more wireline PHY devices. In the exemplary embodiment illustrated in FIG. 3, the subscriber device 300 can include PHY circuitry 302, media access controller (MAC) circuitry 304, and processor circuitry 306.

The PHY circuitry 302 represents an interface between the subscriber device 300 and a communication network, such as the communication network 108 as described above in FIG. 1. In the exemplary embodiment illustrated in FIG. 3, the PHY circuitry 302 includes wireline PHY devices 308.1 through 308.*a* that are compliant with one or more wireless communication standards or protocols and wireless PHY devices 310.1 through 310.*b* are compliant with one or more wireline communication standards or protocols. In an exemplary embodiment, the wireline PHY devices 308.1 through 308.*a* and the wireless PHY devices 310.1 through 310.*b* are compliant with different wireline communication standards or protocols and wireless communication standards or protocols, respectively. However, in some situations, one or more of wireline PHY devices 308.1 through 308.*a* and one or more of the wireless PHY devices 310.1 through 310.*b* can be compliant with the same wireline communication standard or protocol and the same wireless communication standard or protocol, respectively, but are compliant with different versions of their respective communication standard or protocol.

During a scan mode of operation, the PHY circuitry 302 selects one or more of the wireline PHY devices 308.1 through 308.*a* and the wireless PHY devices 310.1 through 310.*b* to scan the communication network for a service provider identification signal from the service provider system. In this scan mode of operation, the PHY circuitry 302 iteratively selects, for example, in a round-robin manner, through the wireline PHY devices 308.1 through 308.*a* and/or the wireless PHY devices 310.1 through 310.*b* to scan the communication network for a service provider identification signal from the service provider system until discovering the service provider system. Thereafter, one of more of the wireline PHY devices 308.1 through 308.*a* and/or the wireless PHY devices 310.1 through 310.*b* which discovered the service provider identification signal demodulates, decodes, and/or converts the service provider identification signal to recover information from the service provider identification signal that uniquely identifies the service provider system to the subscriber device. For example, the information can include a network identifier of the service provider system, a geographic location of the service provider system, and/or a network address of the service provider system to provide some examples. Thereafter, these PHY devices which discovered the service provider identification signal sends the recovered information to the MAC circuitry 304 to determine whether the service provider identification signal corresponds to the service provider system or another service provider system without the service agreement.

During a configuration mode of operation, the one of more of the wireline PHY devices 308.1 through 308.*a* and/or the wireless PHY devices 310.1 through 310.*b* which discovered the service provider identification signal are utilized by the PHY circuitry 302 to receive subscriber device configuration information from the service provider system to configure the PHY circuitry 302 for the upstream direction and/or the downstream direction transfer of information between the service provider system and the subscriber device 300. In an exemplary embodiment, the subscriber device configuration information identifies the wireline PHY devices 308.1 through 308.*a* and/or the wireless PHY devices 310.1 through 310.*b* to be used for the upstream direction and/or the downstream direction transfer of information between the service provider system and the subscriber device. Optionally, the subscriber device configuration information can identify types of information, such as the video, the audio, and/or the data to provide some examples, to be transferred in the upstream direction and/or the downstream direction using the wireline PHY devices 308.1 through 308.*a* and/or the wireless PHY devices 310.1 through 310.*b*. For example, the configuration information can indicate a first wireless PHY device from among the wireless PHY devices 310.1 through 310.*b* is to be used for transferring data in the upstream direction and/or the downstream direction and a first wireline PHY device from among the wireline PHY devices 308.1 through 308.*a* is to be used for transferring video and/or audio in the upstream direction and/or the downstream direction. As another example, the configuration information can indicate the first wireless PHY device is to be used for transferring video, audio, and/or data in the upstream direction and/or the downstream direction. As a further example, the configuration information can indicate the first wireline PHY device is to be used for transferring video, audio, and/or data in the upstream direction and/or the downstream direction.

During a service mode of operation, the PHY circuitry 302 transfers information between the service provider system and the MAC 308 utilizing the wireline PHY devices 308.1 through 308.*a* and/or the wireless PHY devices 310.1 through 310.*b* which have been identified in the subscriber device configuration information.

The MAC circuitry 304 represents an interface between the PHY circuitry 302 and the processor circuitry 306. The MAC circuitry 304 manages and maintains communication of the subscriber device 300 by coordinating access to the PHY circuitry 302 and formats communication in accordance with the one or more wireline communication standards or protocols that are supported by the wireline PHY devices 308.1 through 308.*a* and the one or more wireless communication standards or protocols that are supported by the wireless PHY devices 310.1 through 310.*b*. For example, the MAC circuitry 304 routes the types of information, such as the video, the audio, and/or the data to provide some examples, to be transferred in the upstream direction and/or the downstream direction to their corresponding wireline PHY devices 308.1 through 308.*a* and/or the wireless PHY devices 310.1 through 310.*b* in accordance with the subscriber device configuration information. Moreover, in the downstream direction, the MAC circuitry 304 decapsulates or de-frames information from the PHY circuitry 302 in accordance with the one or more wireline communication standards or protocols and/or the one or more wireless communication standards or protocols and provides this decapsulated or de-framed information to the processor circuitry 306. Otherwise in the upstream direction, the MAC circuitry 304 encapsulates or frames information from the processor circuitry 306 in accordance with the one or more wireline communication standards or protocols and/or the one or more wireless communication standards or protocols and provides this encapsulated or framed information to the PHY circuitry 302.

The processor circuitry 306 controls overall operation and/or configuration of the subscriber device 300. During the scan mode of operation, the processor circuitry 306 monitors the decapsulated or de-framed information provided by the MAC circuitry 304 from the service provider identification signal to determine whether the selected one or more of the wireline PHY devices 308.1 through 308.a and the wireless PHY devices 310.1 through 310.b have discovered the service provider identification signal from the service provider system. For example, the processor circuitry 306 compares the decapsulated or de-framed information provided by the MAC circuitry 304 with previously stored information of the service provider system within the subscriber device 300. In this example, when the decapsulated or de-framed information provided by the MAC circuitry 304 does not match the previously stored information of the service provider system, the selected one or more of the wireline PHY devices 308.1 through 308.a and the wireless PHY devices 310.1 through 310.b have discovered the other service provider system without the service agreement. Otherwise, the selected one or more of the wireline PHY devices 308.1 through 308.a have discovered the service provider system when the decapsulated or de-framed information provided by the MAC circuitry 304 matches the previously stored information of the service provider system.

During the configuration mode of operation, the processor circuitry 306 monitors the decapsulated or de-framed information provided by the MAC circuitry 304 from the subscriber device configuration information to determine the wireline PHY devices 308.1 through 308.a and/or the wireless PHY devices 310.1 through 310.b to be used for the upstream direction and/or the downstream direction transfer of information between the service provider system and the subscriber device. Optionally, the processor circuitry 306 can determine types of information, such as the video, the audio, and/or the data to provide some examples, to be transferred in the upstream direction and/or the downstream direction using the wireline PHY devices 308.1 through 308.a and/or the wireless PHY devices 310.1 through 310.b. Thereafter, the processor circuitry 306 sends one or more activation commands to the PHY circuitry 302 to activate the wireline PHY devices 308.1 through 308.a and/or the wireless PHY devices 310.1 through 310.b to be used for the upstream direction and/or the downstream direction transfer of the information. Optionally, the processor circuitry 306 can send one or more deactivation commands to the PHY circuitry 302 to deactivate wireline PHY devices 308.1 through 308.a and/or wireless PHY devices 310.1 through 310.b not to be used for the upstream direction and/or the downstream direction transfer of the information. In some situations, the processor circuitry 306 can send various instructions to a consumer of the service that is associated with the subscriber device 300 to communicatively couple, for example, plug in, one or more communication cables, such as one or more coaxial cables and/or one or more fiber optics cables to provide some examples, to the wireline PHY devices 308.1 through 308.a. Optionally, the operational control flow 200 can request identifying information, such as a username or a password to provide some examples, from the consumer of the service before the upstream direction and/or the downstream direction transfer of the information.

During the service mode of operation, the processor circuitry 306 transfers information between the consumer of the service provider system and the MAC 308 in accordance with the service agreement.

Exemplary Service Provider System within the Point-to-Multipoint Communication System FIG. 4 illustrates a block diagram of a service provider system that can be implemented within the exemplary point-to-multipoint communication system according to an embodiment of the present disclosure. A service provider system 400 includes multiple physical layer (PHY) devices for the upstream direction and/or the downstream direction transfer of information to and/or from one or more subscriber devices, such as one or more of the subscriber devices 104.1 through 104.n as described above in FIG. 1 to provide an example, within the exemplary point-to-multipoint communication system. As to be described in further detail below, the multiple PHY devices can include includes one or more wireless PHY devices that are complaint with the one or more wireless communication standards or protocols and/or one or more wireline PHY devices that are complaint with the one or more wireline communication standards or protocols. The service provider system 400 can be configured to transfer the information using the one or more wireless PHY devices, the one or more wireline PHY devices, and/or any combination of the one or more wireless PHY devices and the one or more wireline PHY devices. In the exemplary embodiment illustrated in FIG. 4, the service provider system 400 can include PHY circuitry 402, media access controller (MAC) circuitry 404, processor circuitry 406, and a service agreement storage 408.

The PHY circuitry 402 represents an interface between the service provider system 400 and a communication network, such as the communication network 108 as described above in FIG. 1. In the exemplary embodiment illustrated in FIG. 4, the PHY circuitry 402 includes wireline PHY devices 408.1 through 408.a that are compliant with one or more wireless communication standards or protocols and wireless PHY devices 410.1 through 410.b are compliant with one or more wireline communication standards or protocols. In an exemplary embodiment, the wireline PHY devices 408.1 through 408.a and the wireless PHY devices 410.1 through 410.b are compliant with different wireline communication standards or protocols and wireless communication standards or protocols, respectively. However, in some situations, one or more of wireline PHY devices 408.1 through 408.a and one or more of the wireless PHY devices 410.1 through 410.b can be compliant with the same wireline communication standard or protocol and the same wireless communication standard or protocol, respectively, but are compliant with different versions of their respective communication standard or protocol.

The PHY circuitry 402 selects one or more of the wireline PHY devices 408.1 through 408.a and the wireless PHY devices 410.1 through 410.b to provide a service provider identification signal to the communication network. In an exemplary embodiment, the service provider identification signal includes information that uniquely identifies the service provider system 400 to the one or more subscriber devices. For example, the information can include a network identifier of the service provider system, a geographic location of the service provider system, and/or a network address of the service provider system to provide some examples.

Thereafter, the selected one or more of the wireline PHY devices 408.1 through 408.*a* and the wireless PHY devices 410.1 through 410.*b* receive a request for subscriber device configuration information from the one or more one or more subscriber devices. In an exemplary embodiment, the subscriber device configuration information identifies various PHY devices of the one or more subscriber devices to be used for the upstream direction and/or the downstream direction transfer of information between the service provider system 400 and the one or more subscriber devices. Optionally, the subscriber device configuration information can identify types of information, such as the video, the audio, and/or the data to provide some examples, to be transferred in the upstream direction and/or the downstream direction using the various PHY devices of the one or more subscriber devices. The PHY circuitry 402 then transfers information between the MAC 408 and the one or more subscriber devices utilizing the various PHY devices of the one or more subscriber devices in accordance with the subscriber device configuration information.

The MAC circuitry 404 represents an interface between the PHY circuitry 402 and the processor circuitry 406. The MAC circuitry 404 manages and maintains communication of the service provider system 400 by coordinating access to the PHY circuitry 402 and formats communication in accordance with the one or more wireline communication standards or protocols that are supported by the wireline PHY devices 408.1 through 408.*a* and the one or more wireless communication standards or protocols that are supported by the wireless PHY devices 410.1 through 410.*b*. In the downstream direction, the MAC circuitry 404 decapsulates or de-frames information from the PHY circuitry 402 in accordance with the one or more wireline communication standards or protocols and/or the one or more wireless communication standards or protocols and provides this decapsulated or de-framed information to the processor circuitry 406. Otherwise in the upstream direction, the MAC circuitry 404 encapsulates or frames information from the processor circuitry 406 in accordance with the one or more wireline communication standards or protocols and/or the one or more wireless communication standards or protocols and provides this encapsulated or framed information to the PHY circuitry 402.

The processor circuitry 406 controls overall operation and/or configuration of the service provider system 400. For example, the processor circuitry 406 receives the decapsulated or de-framed request for the subscriber device configuration information from the MAC circuitry 404. This request includes information that uniquely identifies the one or more subscriber devices to the service provider system 400. For example, the information can include one or more network identifiers of the one or more subscriber devices, one or more geographic locations of the one or more subscriber devices, and/or one or more network addresses of the one or more subscriber devices to provide some examples. In this example, the processor circuitry 406 queries the service agreement storage 408 for the subscriber device configuration information corresponding to the information.

The service agreement storage 408 stores subscriber device configuration information for all subscribers having service agreements with the service provider system 400 to implement the service. In an exemplary embodiment, the service agreement storage 408 stores the subscriber device configuration information in a database that is indexed to information that uniquely identifies each subscriber. The service agreement storage 408 can include non-transitory machine-readable mediums such as read only memory (ROM), random access memory (RAM), magnetic disk storage media, optical storage media, and/or flash memory devices to provide some examples. In an exemplary embodiment, the service agreement identifies various types of information, such as video, audio, and/or data to provide some examples, to be transferred in the upstream direction and/or the downstream direction between the service provider system 400 and subscribers to the service agreement and/or one or more PHY devices of the subscribers, for example, one or more wireless PHY devices or protocols and/or one or more wireline PHY devices, to be used for transferring the various types of information.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A subscriber device within a point-to-multipoint communication system having a service provider system, the subscriber device comprising:
    physical layer (PHY) circuitry having a first PHY device and a second PHY device, the first PHY device being compliant with a first communication standard or protocol and the second PHY device being compliant with a second communication standard or protocol different from the first communication standard or protocol; and
    processor circuitry configured to select the first PHY device to scan for a service provider identification signal, the service provider identification signal including information identifying the service provider system,
    wherein the first PHY device is configured to receive subscriber device configuration information from the service provider system in response to the first PHY device discovering the service provider identification signal, the subscriber device configuration information identifying video and audio are to be transferred between the subscriber device and the service provider system utilizing the first PHY device and data is to be transferred between the subscriber device and the service provider system utilizing the second PHY device, and
    wherein the processor circuitry is further configured to activate the first PHY device to transfer the video and the audio and the second PHY device to transfer the data in accordance with the subscriber device configuration information.

2. The subscriber device of claim 1, wherein the first communication standard or protocol comprises:
    a wireline communication standard or protocol, and
    wherein the second communication standard or protocol comprises:
    a wireless communication standard or protocol.

3. The subscriber device of claim 1, wherein the first communication standard or protocol comprises:
    a wireless communication standard or protocol, and
    wherein the second communication standard or protocol comprises:
    a wireline communication standard or protocol.

4. The subscriber device of claim 1, further comprising:
    media access controller (MAC) circuitry configured to route the video and the audio to the first PHY device and the data to the second PHY device in accordance with the subscriber device configuration information.

5. The subscriber device of claim 1, wherein the processor is further configured to:
    compare the information identifying the service provider system with previously stored information of the service provider system, and
    instruct the first PHY device to continue to scan for the service provider identification signal when the information identifying the service provider system does not match the previously stored information of the service provider system.

6. The subscriber device of claim 1, wherein the processor is further configured to select the second PHY device to scan for the service provider identification signal in response to the first PHY device being unable to discover the service provider identification signal.

7. The subscriber device of claim 1, wherein the first PHY device is further configured to scan a communication network for the service provider identification signal.

8. The subscriber device of claim 1, wherein the service provider identification signal comprises:
    a network identifier of the service provider system;
    a geographic location of the service provider system; or
    a network address of the service provider system.

9. The subscriber device of claim 1, wherein the processor circuitry is further configured to:
    compare the information identifying the service provider system to previously stored information of the service provider system stored within the subscriber device; and
    determine that the service provider identification signal has been discovered in response to the information identifying the service provider system matching the previously stored information of the service provider system.

10. A service provider system within a point-to-multipoint communication system having a subscriber device, the service provider system comprising:
    physical layer (PHY) circuitry, having a first PHY device and a second PHY device, configured to transfer video, audio, and data between the subscriber device and the service provider system in accordance with a service agreement; and
    processor circuitry configured to select the first PHY device to provide a service provider identification signal identifying the service provider system, the first PHY device being compliant with a first communication standard or protocol,
    wherein the first PHY device is configured to:
        receive a request for subscriber device configuration information associated with a service agreement in response to the subscriber device discovering the service provider identification signal, wherein the service agreement provides the video and the audio are to be transferred between the subscriber device and the service provider system utilizing the first PHY device and the data is to be transferred between the subscriber device and the service provider system utilizing the second PHY device, the second PHY device being compliant with a second communication standard or protocol different from the first communication standard or protocol, and provide the subscriber device configuration information to configure the subscriber device for the transfer of the video, the audio, and the data between the subscriber device and the service provider system in accordance with the service agreement.

11. The service provider system of claim 10, wherein the first communication standard or protocol comprises:
   a wireline communication standard or protocol, and
   wherein the second communication standard or protocol comprises:
   a wireless communication standard or protocol.

12. The service provider system of claim 10, wherein the first communication standard or protocol comprises:
   a wireless communication standard or protocol, and
   wherein the second communication standard or protocol comprises:
   a wireline communication standard or protocol.

13. The service provider system of claim 10, further comprising:
   media access controller (MAC) circuitry configured to route the video and the audio to the first PHY device and the data to the second PHY device in accordance with the service agreement.

14. The service provider system of claim 10, further comprising:
   a service agreement storage that stores a plurality of subscriber device configuration information for a plurality of subscriber devices having one or more service agreements with the service provider system, the plurality of subscriber device configuration information being indexed by information identifying the plurality of subscribers,
   wherein the processor circuitry is further configured to query the service agreement storage for the subscriber device configuration information for the subscriber device from among the plurality of subscriber device configuration information.

15. The service provider system of claim 10, wherein the service provider identification signal comprises:
   a network identifier of the service provider system;
   a geographic location of the service provider system; or
   a network address of the service provider system.

16. A method for transferring video, audio, and data between a subscriber device and a service provider system within a point-to-multipoint communication system, the method comprising:
   selecting a first physical layer (PHY) device from among a plurality of PHY devices of the subscriber device to communicate with the service provider system;
   scanning a communication network for a service provider identification signal from the service provider system using the first PHY device;
   receiving subscriber device configuration information from the service provider system in response to discovering the service provider identification signal; and
   configuring the first PHY device for the transfer of the video and the audio between the subscriber device and the service provider system and a second PHY device from among the plurality of PHY devices for the transfer of the data between the subscriber device and the service provider system in accordance with the subscriber device configuration information.

17. The method of claim 16, further comprising:
   selecting the second PHY device to scan for the service provider identification signal in response to the first PHY device being unable to discover the service provider identification signal.

18. The method of claim 16, wherein the subscriber device configuration information identifies the first PHY device is to transfer the video and the audio and the second PHY device is to transfer the data.

19. The method of claim 16, wherein the service provider identification signal comprises:
   a network identifier of the service provider system;
   a geographic location of the service provider system; or
   a network address of the service provider system.

20. The method of claim 16, further comprising:
   comparing information identifying the service provider system from the service provider identification signal to previously stored information of the service provider system stored within the subscriber device; and
   determining that the service provider identification signal has been discovered in response to the information identifying the service provider system matching the previously stored information of the service provider system.

* * * * *